UNITED STATES PATENT OFFICE 2,519,441

TRIS-QUATERNARY SALTS OF 1,3,5-TRIS-DIMETHYLAMINOMETHYL BENZENE AND ALKYL BENZYL CHLORIDES

Peter L. de Benneville, Philadelphia, Pa., and Richard W. Gormly, Collingswood, N. J., assignors to Rohm & Haas Company, Philadelphia, Pa., a corporation of Delaware No Drawing. Application June 29, 1949, Serial No. 102,148

4 Claims. (Cl. 260—567.6)

This invention deals with tris-quaternary salts of 1,3,5 - tris(dimethylaminomethyl)benzene and alkylbenzyl chlorides in which the alkyl group contains six to seven carbon atoms. These salts have the general formula

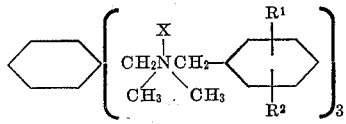

where $R^1$ is an alkyl group of six to seven carbon atoms and $R^2$ is hydrogen or the methyl group. The salts in which $R^2$ is hydrogen constitute a preferred group. X is chlorine or bromine.

The tris-quaternary ammonium halides of this invention are prepared by reacting by addition an alkylbenzyl halide and tris(dimethylaminomethyl)benzene. These products are solids which have slight solubility in water. They are amply soluble in isopropanol-water mixtures. They are potent bactericides and have good fungicidal activity.

Tris(dimethylaminomethyl)benzene is a new chemical substance which results from the trimerization of dimethylaminopropyne, as described in application Serial No. 102,163, filed by Van Hook and Croxall on June 29, 1949. As is shown by these applicants, 3-dimethylamino-1-propyne is heated at 50° to 120° C., preferably 60° to 80° C., in the presence of 0.25% to 5% of a nickel carbonyl catalyst of the formula $Ni(CO)_{4-x}(MAr_3)_x$, wherein M is phosphorus or arsenic, $x$ has a value from one to two, and Ar is a phenyl group. As is known, 3-dimethyl-1-propyne is available through the reaction of dimethylamine, formaldehyde, and acetylene in the presence of a copper catalyst. The trimerization reaction proceeds exothermally when once started by heating and may be completed on continued heating.

Example 1

A typical preparation of 1,3,5-tris(dimethylaminomethyl)benzene follows. There were mixed 415 parts by weight of 3-dimethylamino-1-propyne, 400 parts by weight of a petroleum ether boiling between 35° and 70° C., and 10 parts of a catalyst prepared by mixing one molar proportion of nickel carbonyl and two molar proportions of triphenyl phosphine in benzene. The mixture was heated to 57° C. whereupon reaction took place and was controlled by external cooling. When the initial reaction had subsided, the mixture was maintained at 57°–58° C. for three hours. The reaction mixture was filtered and the filtrate was distilled. A fraction of 268 parts was obtained at 91°–175° C./1–5 mm. This fraction corresponded by analysis to 1,3,5-tris(dimethylaminomethyl)benzene.

The alkylbenzyl halides which are required are prepared from alkylbenzenes or alkyltoluenes in which the alkyl group has six to seven carbon atoms. The alkyl group may be of straight or branched chain. It may be primary, secondary or tertiary. The relative position of alkyl group and methyl group in the alkyltoluenes appears of little importance. The same holds true for the relative position of alkyl group and halomethyl group in the alkylbenzyl halides.

For preparing alkylbenzenes and alkyltoluenes, known methods may be used. For example, an acyl halide of six to seven carbon atoms may be reacted with benzene or toluene and the acyl group thus introduced is then reduced. Olefins of six to seven carbon atoms may be reacted with benzene or toluene by known methods and various hexylbenzenes, heptylbenzenes, hexyltoluenes, and heptyltoluenes thus produced.

These are then reacted with a hydrogen halide and formaldehyde in the presence of zinc chloride and a lower aliphatic fatty acid, such as formic, acetic, chloroacetic, or propionic. The method in general follows that described in application Serial No. 28,274, filed by de Benneville and Bock on May 20, 1948. It is desirably modified by use of somewhat more of the acid and/or use of lower temperatures, since the original method is designed to halomethylate octylbenzenes to octadecylbenzenes, the hexylbenzenes and heptylbenzenes being halomethylated with somewhat greater ease. The halomethylation is accomplished with anhydrous formaldehyde and hydrogen chloride, or bromide, in the presence of a catalyst mixture from one molecular proportion of zinc chloride and about two to eight molecular proportions of the acid. Somewhat more acid is here permissible. The equivalent of formaldehyde and hydrogen halide is supplied by use of a halomethyl ether. One molecular proportion of alkylbenzene or alkyltoluene is used with 0.75 to 2.5 molecular proportions of zinc chloride. Reaction temperatures of 30° to 100° C. are here useful.

Typical examples of the preparation of alkylbenzyl halides follow.

Example 2

Commercial 3-heptanol was dehydrated on an alumina catalyst at 400° C. to yield a mixture of 2-heptene and 3-heptene, which was taken off and distilled.

There were mixed 125 parts by weight of this product, 198 parts of benzene, and 196 parts of concentrated sulfuric acid, while the mixture was stirred and held at 5° C. The mixture was stirred for three hours more while the temperature was carried to about 40° C. Layers were then allowed to form and the upper layer taken. This was twice washed with sulfuric acid and distilled to yield 167 parts of heptylbenzene, probably a mixture of 2-heptylbenzene and 3-heptylbenzene.

There were mixed 160 parts of this product, 90 parts of anhydrous zinc chloride, and 138 parts of glacial acetic acid. With this mixture at 60° C., thereto was added 106 parts of dichloromethyl ether. The reaction mixture was stirred for four hours and then allowed to form layers, which were separated. The upper layer was washed with water, with sodium bicarbonate solution, and with water, and distilled. The fraction collected at 127° to 132° C./2 mm. amounted to 128 parts. It corresponded in composition to heptylbenzyl chloride.

*Example 3*

Hexylbenzene, prepared by the alkylation of benzene with propylene dimer, was mixed in an amount of 60 parts by weight with 50 parts of zinc chloride and 70 parts of acetic acid at 50°–55° C., and 40 parts of dichloromethyl ether was added thereto over a period of one hour. The reaction mixture was held at 55° to 60° C. for an hour and then cooled. Layers were allowed to form and were separated. The upper layer was washed with water and sodium bicarbonate solution and then distilled under reduced pressure. The fraction collected at 120°–130° C./0.2 mm. corresponded in composition to hexylbenzyl chloride. It had the structure of p-1,3-dimethylbutyl-benzyl chloride.

*Example 4*

A mixture was made from 40 parts of hexylbenzene, prepared as in Example 3, 50 parts of anhydrous zinc chloride, and 40 parts of glacial acetic acid and heated to 60° C. Thereto was added dropwise 50 parts of bis bromomethyl ether. The reaction mixture was then stirred and heated at 60°–65° C. for four hours. Layers were then allowed to form and were separated. The upper layer was washed with hot water, with 10% sodium bicarbonate solution, and with water. The washed liquid was dried over sodium sulfate and distilled at 140°–150° C./1–2 mm. to give a fraction corresponding in composition to hexylbenzyl bromide.

*Example 5*

Heptene, prepared as in Example 2, was mixed in an amount of 100 parts by weight with 175 parts by weight of toluene and 175 parts of sulfuric acid while the mixture was stirred and cooled in an ice bath. After an hour the bath was removed and the stirring continued while the mixture reached room temperature over the course of several hours. Layers were allowed to form and were separated. The organic layer was twice washed with sulfuric acid and distilled. The fraction obtained at 84°–110° C./2.5 mm. corresponded in composition to heptyltoluene.

There were mixed 79 parts of the heptyltoluene, 40 parts of zinc chloride, and 75 parts of glacial acetic acid. This mixture was heated to 50°–55° C. and 50 parts of dichloromethyl ether slowly added. The mixture was stirred for four hours and then allowed to form layers, which were separated. The upper layer was washed with water, with sodium bicarbonate solution, and again with water, was then dried on sodium sulfate, and was filtered. The product obtained corresponded in composition to heptylmethylbenzyl chloride.

*Example 6*

To a mixture of 60 parts of (2-ethylbutyl)benzene (prepared according to the method of Sulzbacher and Bergmann, Journal of Organic Chemistry 13, 303 (1948)), 40 parts of anhydrous zinc chloride, and 60 parts of glacial acetic acid, there was added with stirring 43 parts of dichloromethyl ether over the course of an hour while the reaction mixture was held at 60° C. Stirring was continued for another two hours with the temperature maintained at 60° C. Layers were then allowed to form and were separated. The product layer was washed with sodium bicarbonate solution and distilled at 110°–120° C./0.5 mm. The distillate corresponded in composition to p-(2-ethylbutyl)benzyl chloride.

For the preparation of the tris-quaternary salts, tris(dimethylaminomethyl)benzene is reacted with an alkylbenzyl or alkylxylyl halide,

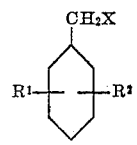

wherein $R^1$ is an alkyl group of six to seven carbon atoms and $R^2$ is hydrogen or the methyl group, in a mole ratio of about one to three. The two reactants are mixed and heated at 50° C. to 120° C. The reaction may, if desired, be performed in the presence of an inert organic solvent, such as benzene, toluene, xylene, naphtha, an alcohol, such as ethyl, isopropyl, or butyl alcohol, a nitroparaffin, formamide, acetonitrile, or the like, or mixtures thereof. Heating is conveniently carried out at reflux temperatures and continued until tests show a high proportion of ionizable halide. Reaction times of two to twenty-four hours are generally suitable. These considerations will be illustrated with specific examples wherein the parts are by weight.

*Example 7*

A mixture of 46.8 parts of a hexylbenzyl chloride, chiefly p-(1,3-dimethylbutyl)benzyl chloride, 18.5 parts of 1,3,5-tris(dimethylaminomethyl)benzene, and 265 parts of benzene was heated under reflux for five hours. The benzene was then distilled from the mixture and stripped by heating the reaction product to 95° C. under reduced pressure. The product was obtained in an amount of 55 parts as a reddish brown, brittle solid which was soluble in a mixture of isopropanol and water. It contained 12.1% of ionizable chlorine (theory 12.1%).

This product had a phenol coefficient of 350 against *Salmonella typhosa* and 710 against *Staphylococcus aureus*.

*Example 8*

The procedure of Example 7 was followed with a mixture of 38.3 parts of hexylbenzyl bromide, 12.5 parts of tris(dimethylaminomethyl)benzene, and 180 parts of benzene. The product was a brownish solid which was slightly soluble in warm water and soluble in isopropanol-water mixtures. The product corresponds in composition to

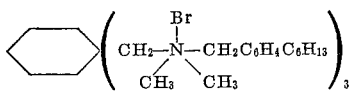

It has phenol coefficients of 325 against *Salmonella typhosa* and 700 against *Staphylococcus aureus*.

*Example 9*

A mixture of 225 parts of heptylbenzyl chloride, the heptyl groups being chiefly p-1,4-dimethylpentyl, 8.3 parts of 1,3,5-tris(dimethylaminomethyl)benzene, and 66 parts of benzene was heated under reflux for four hours. The benzene was distilled therefrom and the product stripped by heating to about 95° C. under low pressure. There was obtained 29 parts of a reddish-brown, brittle solid which was somewhat soluble in hot water and freely soluble in water-isopropanol mixtures. It contained 10.5% of ionizable chlorine, the theoretical value for this compound being 11.5%. It was found to have phenol coefficients of 470 and 460 against *Salmonella typhosa* and *Staphylococcus aureus* respectively.

*Example 10*

The procedure of Example 9 was followed with a mixture of 23.9 parts of heptylmethylbenzyl chloride, 8.3 parts of 1,3,5-tris(dimethylaminomethyl)benzene, and 70 parts of toluene. The solvent was distilled under reduced pressure, the final temperature of 110° C. being reached under reduced pressure. This product resembled the previously described ones. It was soluble in water-isopropanol mixtures. It had a phenol coefficient of 570 against *Staphylococcus aureus*. In fungitoxicity tests, it inhibited the germination of spores of *Sclerotinia fructicola* and *Macrosporium sarcinaeforme* at 0.005%.

There were also prepared similar tris-quaternary salts with alkylbenzyl groups in which the alkyl group was less than six or more than seven. There was a marked decrease in phenol coefficients in each case. For example, with amyl groups or octyl groups the phenol coefficient against *Salmonella typhosa* was 115. The tris-quaternary salts here claimed thus have an unexpected activity.

We claim:

1. Tris-quaternary salts of the formula

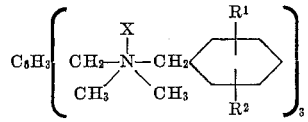

where $R^1$ is an alkyl group of six to seven carbon atoms, $R^2$ is a member of the class consisting of hydrogen and the methyl group, and X is a member of the class consisting of chlorine and bromine.

2. A tris-quaternary salt of the formula

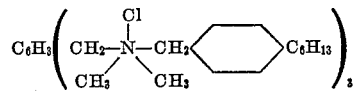

3. A tris-quaternary salt of the formula

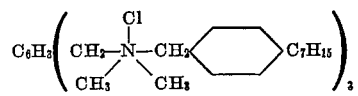

4. A tris-quaternary salt of the formula

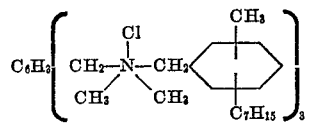

PETER L. DE BENNEVILLE.
RICHARD W. GORMLY.

No references cited.